(12) United States Patent
Fairbanks et al.

(10) Patent No.: US 9,824,402 B2
(45) Date of Patent: Nov. 21, 2017

(54) TIME CLOCK FOR TRACKING EMPLOYEES

(71) Applicant: Vivint, Inc., Provo, UT (US)

(72) Inventors: Greg Fairbanks, Cedar Hills, UT (US); Brandon Hatch, Provo, UT (US)

(73) Assignee: Vivint, Inc., Provo, UT (US)

( * ) Notice: Subject to any disclaimer, the term of this patent is extended or adjusted under 35 U.S.C. 154(b) by 17 days.

(21) Appl. No.: 14/260,139

(22) Filed: Apr. 23, 2014

(65) Prior Publication Data
US 2015/0310565 A1   Oct. 29, 2015

(51) Int. Cl.
| | | |
|---|---|---|
| G05B 15/00 | (2006.01) | |
| G06F 15/02 | (2006.01) | |
| G06Q 40/00 | (2012.01) | |
| H04L 29/06 | (2006.01) | |

(52) U.S. Cl.
CPC ....... *G06Q 40/125* (2013.12); *H04L 63/0815* (2013.01)

(58) Field of Classification Search
CPC ...... G06Q 40/10; G06Q 30/04; G06Q 10/091; G05B 15/02; G05B 19/0426; G05B 19/042; G05B 19/409
USPC ..... 705/17, 32; 379/265.05, 265.06; 700/83; 707/781; 709/223, 227; 719/310
See application file for complete search history.

(56) References Cited

U.S. PATENT DOCUMENTS

| | | | | |
|---|---|---|---|---|
| 6,883,709 | B2* | 4/2005 | Joseph | G06K 17/00 235/381 |
| 6,922,488 | B2* | 7/2005 | Mastrianni | G06Q 20/3674 382/199 |
| 7,089,200 | B2* | 8/2006 | Bode | G06Q 10/06311 705/1.1 |
| 7,185,807 | B1* | 3/2007 | Robinson | G07C 1/10 235/375 |
| 8,751,616 | B2* | 6/2014 | Karklins | G05B 19/05 700/83 |
| 8,767,947 | B1* | 7/2014 | Ristock | H04M 3/5238 379/265.06 |
| 2002/0145559 | A1* | 10/2002 | Sullivan | G07C 1/10 342/357.74 |
| 2003/0046196 | A1* | 3/2003 | Kelly | G06Q 10/06398 705/32 |
| 2004/0089713 | A1* | 5/2004 | Weaver | G06Q 10/10 235/380 |
| 2008/0114683 | A1* | 5/2008 | Neveu | G06Q 10/06 705/50 |
| 2008/0177646 | A1* | 7/2008 | Frink | G06Q 10/1091 705/32 |
| 2009/0127328 | A1* | 5/2009 | Aissa | G06K 9/00087 235/377 |

(Continued)

*Primary Examiner* — Andrew Joseph Rudy
(74) *Attorney, Agent, or Firm* — Holland & Hart LLP

(57) ABSTRACT

Methods and systems are described for employee time entry using an automation and security system. An apparatus for employee time entry includes a processor, a memory in electronic communication with the processor, and instructions stored in the memory which are executable by a processor to request employee login at a control panel of an automation and security system at initiation of the employee's work shift, request employee logout at the control panel at completion of the employee's work shift, and collect data related to at least one of employee work hours, shift frequency, and employee cost.

9 Claims, 8 Drawing Sheets

(56) References Cited

U.S. PATENT DOCUMENTS

| | | | |
|---|---|---|---|
| 2009/0254464 A1* | 10/2009 | Bonner | G06Q 10/1091 705/32 |
| 2011/0045801 A1* | 2/2011 | Parker, II | H04M 1/72538 455/411 |
| 2011/0276445 A1* | 11/2011 | Chess | G06Q 10/06 705/32 |
| 2014/0278629 A1* | 9/2014 | Stephenson | H04L 67/22 705/7.13 |
| 2014/0378167 A1* | 12/2014 | Haney | H04M 1/72519 455/456.3 |

* cited by examiner

TIME CLOCK FOR TRACKING EMPLOYEES

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, opportunities exist for using the control panel of the automation and security systems for alternative purposes such as tasks related to a business.

SUMMARY

Methods and systems are described for employee time entry using an automation and security system. According to at least one embodiment, an apparatus for employee time entry includes a processor, a memory in electronic communication with the processor, and instructions stored in the memory which are executable by a processor to request employee login at a control panel of an automation and security system at initiation of the employee's work shift, request employee logout at the control panel at completion of the employee's work shift, and collect data related to at least one of employee work hours, shift frequency, and employee cost.

In one embodiment, the instructions are executable by the processor to transmit the data to a device remote from the control panel. The instructions may be executable by the processor to generate a notice when the data meets a predetermined criteria. The instructions may be executable by the processor to request employee safety information at the control panel when the employee logs out. The instructions may be executable by the processor to determine from the data whether the employee has logged in on time for the work shift and generate a notice if the employee is late for the work shift.

In another embodiment, the instructions are executable by the processor to determine from the data whether the employee has worked a predetermined number of hours within a given time period. The instructions may be executable by the processor to capture and store an image of the employee. The instructions may be executable by the processor to compare the image to a previously stored image of the employee to confirm identity of the employee. The instructions may be executable by the processor to confirm identity of the employee with one of an employee image, an employee voice, and an employee fingerprint.

Another aspect of the present disclosure relates to a computer-program product for employee time entry using an automation and security system. The computer-program product includes a non-transitory computer-readable medium storing instructions executable by a processor to receive an employee login at a user interface of an automation and security system at initiation of an employee shift, receive an employee logout at the user interface at completion of the employee shift, determine employee work data related to the employee login and logout, and generate a notice when a predetermined criteria related to the employee work data is met.

In one embodiment, the instructions are executable by the processor to display at least one message on the control panel for the employee at at least one of login and logout. The instructions may be executable by the processor to request confirmation from the employee that a message is received at the user interface before permitting the employee to at least one of login and logout. The instructions may be executable by the processor to transmit the notice to a remote device. The user interface may be a control panel of the automation and security system. The instructions may be executable by the processor to display the notice on the control panel.

A further aspect of the present disclosure relates to a computer-implemented method for employee time entry using an automation and security system. The method includes receiving an employee login at a user interface of an automation and security system at initiation of an employee shift, receiving an employee logout at the user interface at completion of the employee shift, and receiving employee performance data at least at the time of logout.

In one embodiment, the employee performance data includes safety practices of the employee. The method may include determining employee work data based on the employee login and logout. The method may include generating a notice when a predetermined criteria related to the employee work data is met. The method may include capturing an image of the employee at at least one of login and logout.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
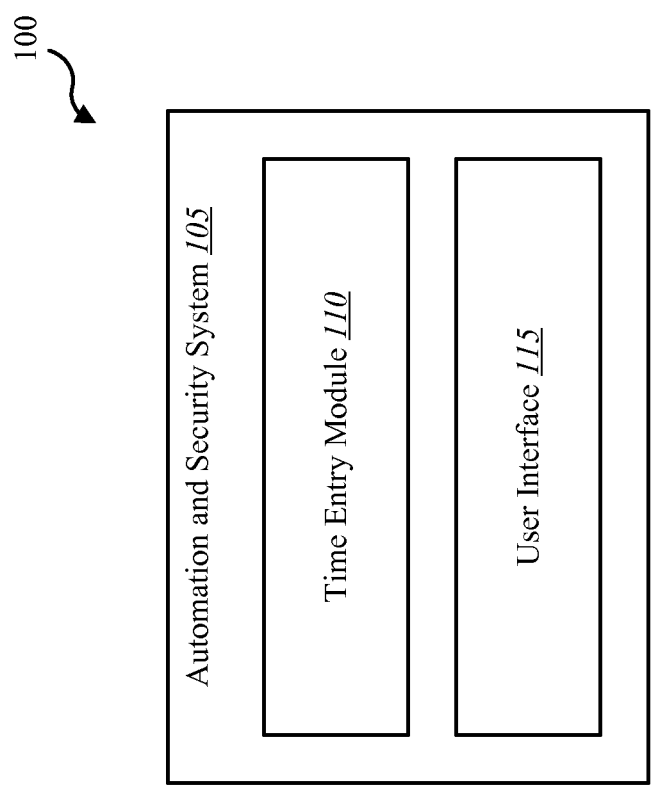
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

At least some of the systems and methods described herein relate to automation and security systems for use in commercial and business settings. For example, the systems and methods described herein may relate to employee work data, such as employee clock-in and clock-out times, work frequency, shift related costs, identification confirmation, and safety practices in commercial and business settings. Other aspects of the present disclosure relate generally to interfaces between the employee and a time clock system, generating notices related to the employee work data, and providing instructions and/or modification to personnel or other business practices based on the employee work data.

In one example, the systems and methods described herein are directed to using a control panel of an automation and security system for employee clock-in and clock-out functions. The control panel may include a display and other user interface features that permit the employee to clock-in at the beginning of a work shift and clock-out at the end of the work shift. Typically, the control panel is located at a place of business and is often located adjacent to an entrance or exit to the place of business. As such, employees arriving at and departing from the workplace may conveniently access the control panel for clock-in and clock-out functions.

Data related to the employees' work schedule based on, for example, their clock-in and clock-out information may be analyzed and/or processed in a way that provides a variety of metrics that may be useful for the business owner, manager, or employee. One metric may relate to whether the employee is consistently arriving for a scheduled work shift on time. Another metric may include the number of hours the employee is working within a given time period (e.g., within a given day, week or pay period). In another example, the net costs associated with the employee working a given shift may be determined by multiplying the employee's hourly wages by the number of hours that the employee is working. Information related to the various metrics that are analyzed and/or processed may be transmitted to a variety of people and/or locations using, for example, push notifications. In one embodiment, notifications related to the employee work data are transmitted to a remote device, such as a cellular phone of the business owner who is located away from the place of business or a desktop computer of the business owner at the place of business but remote from the location of employee clock-in or clock-out. The remote device may include a user interface that permits the business owner to send instructions in response to the information received at the remote device. The instructions may include, for example, providing a notice to an employee related to their upcoming scheduled work shift, notifying an on-site manager to call in more personnel and/or send home an employee early, or the like.

The display and/or user interface where the employee clocks-in or clocks-out may be used to provide notifications to the employee. In some embodiments, the employee must confirm that they have read notices viewable on the display prior to being able to clock-in or clock-out. In other embodiments, the employee is prompted to enter information such as, for example, work conditions, safety practices, customer service metrics, sales information, etc. as part of clocking-in or clocking-out.

Additionally, or alternatively, the systems and methods described herein may provide for identification verification of the employee at any time. For example, the system may include a camera or video device that collects images of the employee at, for example, the time of clocking-in or clocking-out as a backup identification method. Other identification verification methods including, for example, an ID pin, fingerprint scanner, retinal scanner, voice recognition, or security card may be used to provide additional identification of the employee.

The systems and methods disclosed herein may also provide for remote clock-in and clock-out by employees at a location other than the place of business. For example, an employee may be able to access the time entry system or features thereof of an automation and security system remotely via a network. The time entry features for clock-in, clock-out and other employee-related work data may be entered via a remote device such as a tablet computer, laptop computer, desktop computer, smartphone, or other device that provides communication with the automation and security system. In one example, an employee may clock-in at the control panel of the automation and security system at a place of business, leave the place of business as part of his employment duties, and clock-out at a different location such as, for example, his home, a branch office of the business, or a point of delivery associated with his employment.

FIG. 1 is a block diagram illustrating one embodiment of an environment 100 in which the present systems and methods may be implemented. In some embodiments, the systems and methods described herein may be performed at least in part on or using an automation and security system 105. The environment 100 may include the automation and security system 105, a time entry module 110, and a user interface 115. While FIG. 1 shows the time entry module 110 and user interface 115 included within the automation and security system 105, these and other components of environment 100 may be housed separately and operable independent while still working cooperatively with each other and other components of automation and security system 105.

Time entry module 110 may be configured to receive employee work data and perform any of a plurality of functions in response to the employee work data. At least some of the employee work data may be inputted via the user interface 115. The user interface 115 may receive information such as, for example, employee clock-in and clock-out information, responses to questions posed to the employee, responses posed to the employer, and the like. At least some aspects of time entry module 110 and user interface 115 may be integrated with other components and functionality of automation and security system 105. For example, user interface 115 may be integrated into an existing control panel of automation and security system 105. The control panel may include a user interface for controlling other features of automation and security system 105 such as, for example, alarm systems, sensor activation, light controls, appliance controls, thermostat controls, etc. User interface 115 may include a display (e.g., a touch screen), actuation buttons and other control features of a control panel of the automation and security system 105. Alternatively, or additionally, user interface 115 may be a separate component from the control panel of the automation and security system 105 and may be located at any desired location relative to a place of business, property, or the like that is monitored by the automation and security system 105. User interface 115 may be available at a plurality of locations such as, for example, any of several control panels of automation and security system 105, or a remote device such as a tablet computer, desktop computer, smartphone, or the like that is positioned remote from the place of business being monitored by automation and security system 105.

Time entry module 110 may, in addition to receiving employee work data, have the capability to store the data, analyze the data, create notifications related to the data, store criteria against which the data is evaluated, and other functions as described in further detail below with reference to FIG. 3. Time entry module 110 may include the capability to confirm identification of an employee using any of a variety of identification verification techniques. Time entry module 110 may also be capable of receiving communications from a remote device in response to or separate from the employee work data. Time entry module 110 may perform additional functions in response to instructions received from a remote source.

Figure 2:
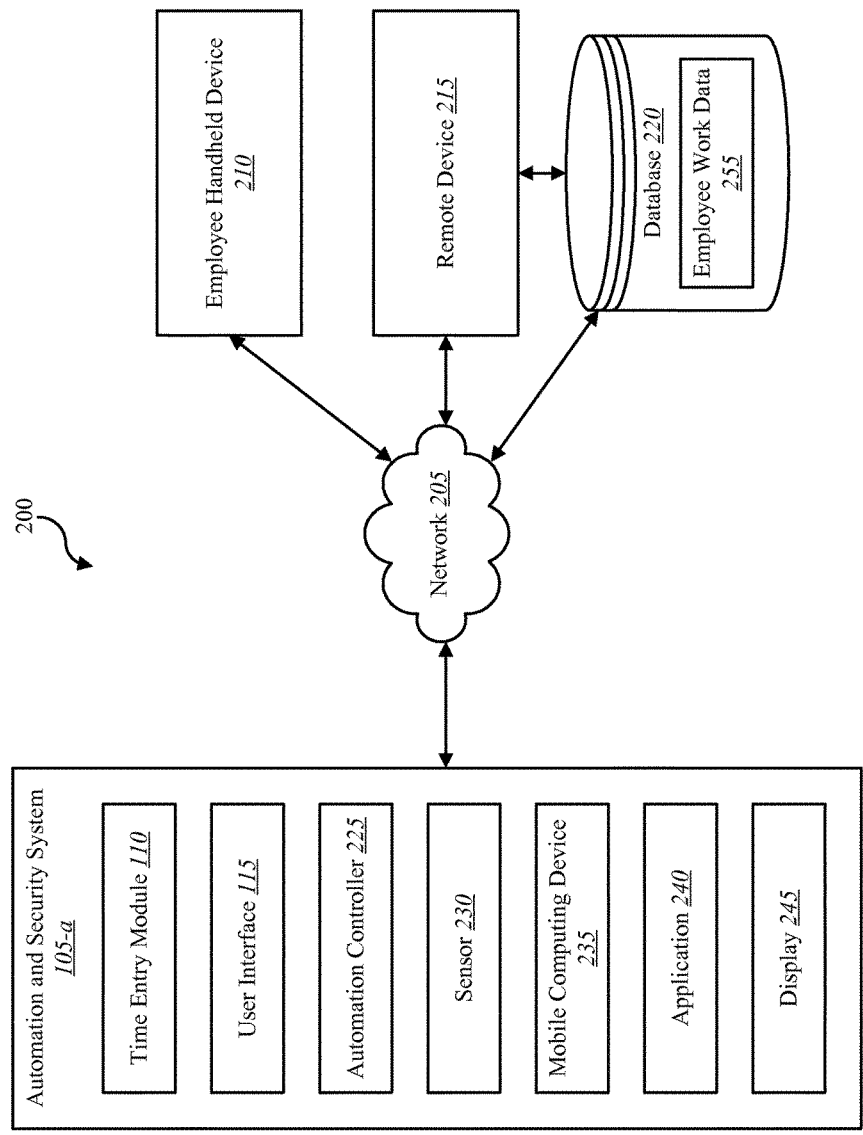
FIG. 2 is a block diagram of another environment in which the present systems and methods may be implemented.

Referring now to FIG. 2, in some embodiments, an environment 200 may include the components of environment 100 described above, and may further include a network 205, an employee handheld device 210, a remote device 215, and a database 220. Automation and security system 105-a may be one example of automation and security system 105 described above with reference to FIG. 1. Automation and security system 105-a may include, in addition to time entry module 110 and user interface 115, an automation controller 225, a sensor 230, mobile computing device 235, application 240, and display 245. Database 220 may include (e.g., store) employee work data 255.

Automation and security system 105-a may include various components and functionality that work cooperatively with time entry module 110 and user interface 115, and/or may operate independently of time entry module 110 and user interface 115. For example, automation controller 225 may provide at least some automated control of various features of automation and security system 105-a. One such automated control feature may be to automatically carry out various tasks in response to employee work data collected and/or analyzed by time entry module 110. In one embodiment, automation controller 225 turns off building lights, reduces a thermostat setting, or turns on a security feature of automation and security system 105-a at the time an employee clocks-out via user interface 115.

Sensor 230 shown in FIG. 2 may represent one or more separate sensors or a combination of two or more sensors in a single sensor device. For example, sensor 230 may represent one or more camera sensors and one or more motion sensors connected to or a part of automation and security system 105-a. Additionally, or alternatively, sensor 230 may represent a combination sensor such as both a camera sensor and a motion sensor integrated into the same sensor device. Although sensor 230 is depicted as connecting to or a part of automation and security system 105-a, in some embodiments sensor 230 may be dedicated exclusively to the time entry module 110 and/or user interface 115, or may be operable independent of and separately from any functionality of time entry module 110 and user interface 115. Sensor 230 may include an accelerometer to enable sensor 230 to detect movement (e.g., movement of an employee at a place of business). Sensor 230 may include a wireless communication device enabling sensor 230 to read and receive data and/or information to and from one or more devices in environment 200 (e.g., time entry module 110). Additionally, or alternatively, sensor 230 may include a GPS sensor to enable sensor 230 to track a location of sensor 230 or an employee. Sensor 230 may include a proximity sensor to enable sensor 230 to detect proximity of a user (e.g., employee) relative to a predetermined distance from a dwelling (e.g., inside or outside a building or perimeter of a place of business). Sensor 230 may include one or more security detection sensors such as, for example, a glass break sensor, a motion detection sensor, or both. Additionally, or alternatively, sensor 230 may include a smoke detection sensor, a carbon monoxide sensor, a fire detection sensor, or some combination thereof.

The employee work data described herein may include data collected by sensor 230. In some embodiments, mobile computing device 235 may include one or more processors, one or more memory devices, and/or a storage device. Examples of mobile computing device 235 may include mobile computing devices, smartphones, personal computing devices, computers, servers, etc. Mobile computing device 235 may be operable independent of features of time entry module 110 and user interface 115. Alternatively, at least some functionality of mobile computing device 235 may cooperate with and/or interface with time entry module 110 and/or user interface 115.

Application 240 may allow a user to control (either directly or via automation controller 225) an aspect of the monitored property, including security, energy management, locking or unlocking a door, checking the status of a door, locating a user or item, controlling lighting, thermostat, cameras, receiving notification regarding a current status or anomaly associated with a home, office, place of business, and the like. In some configurations, application 240 may enable automation and security system 105-a to interface with automation controller 225 and/or a time entry module 110 and display automation, security, and/or energy management content on, for example, time entry module 110, user interface 115, mobile computing device 235, or display 245. Thus, application 240, via the user interface 115 or other feature of automation and security system 105-*a*, may allow users to control aspects of their home, office, and/or other type of property (e.g., place of business where an employee clocks-in, clocks-out, or performs certain responsibilities related to his employment). Further, application 240 may be installed on mobile computing device 235 in order to allow a user to interface with a function of automation and security system 105-*a* or automation controller 225. Information or data associated with application 240 and its operation may be saved according to the data storage methods described herein.

In some embodiments, a user may access the functions of automation and security system 105-*a* from mobile computing device 235. For example, in some embodiments, mobile computing device 235 includes a mobile application that interfaces with one or more functions of automation and security system 105-*a* (e.g., time entry module 110). Examples of automation controller 225 may include a dedicated automation computing device (e.g., wall-mounted controller), a personal computing device (e.g., a laptop, desktop, etc.), a mobile computing device (e.g., tablet computing device, smartphone, etc.), and the like. Time entry module 110 and/or user interface 115 may be integrated with automation controller 225 in the form of one or more personal computing devices (e.g., mobile devices, smartphones, and/or personal computing devices) to both control aspects of the property, receive and display notifications regarding the activity of a property, and monitor activities of an employee (e.g., clock-in, clock-out, perform duties, etc.).

In some embodiments, employee handheld device 210 is a mobile device unique to an employee. Employee handheld device 210 may include, for example, a personal computing device (e.g., laptop), a mobile computing device (e.g., tablet computing device, smartphone, etc.), or the like. Employee handheld device 210 may be in communication with time entry module 110 or other features or components of automation and security system 105-*a* via, for example, network 205. Employee handheld device 210 may be capable of two-way communication with time entry module 110 and other features of automation and security system 105-*a* including, for example, receiving notifications from and sending information (e.g., notifications, instructions, etc.) back to time entry module 110 or other features of automation and security system 105-*a*. Employee handheld device 210 may include a display and/or user interface. Notifications may be received on employee handheld device 210 in the form of, for example, a text message, email, audible signal, picture, etc. The notifications received at employee handheld device 210 may be in response to employee work data 255 which is collected and/or generated via time entry module 110 and/or user interface 115 and delivered to remote device 215 and/or database 220, or directly to employee handheld device 210. Employee handheld device 210 may also include storage capability to store data such as employee work data, notifications, schedules, contact information, etc. associated with his employment.

Remote device 215 may also communicate with time entry module 110 and other features and components of automation and security system 105-*a* via, for example, network 205. Remote device 215 may be any of a number of electronic devices including, for example, a dedicated automation computing device (e.g., wall-mounted controller), a personal computing device (e.g., laptop, desktop, etc.), a mobile computing device (e.g., a tablet computing device, smartphone, etc.), and the like. Remote device 215 may be located physically away from automation and security system 105-*a* or components thereof such as, for example, user interface 115. Remote device 215 may be accessed by, for example, an owner of the place of business, manager, supervisor, or other personnel associated with the place of business where the employee is employed. Remote device 215 may be configured for two-way communication with time entry module 110 and other features of automation and security system 105-*a*. Remote system 215 may receive notifications and information associated with an employee (e.g., employee work data). The employee work data may be accessed directly from database 220, from employee handheld device 210 via, for example, network 205 and/or time entry module 110, or other components of automation and security system 105-*a*. Employee work data 255 may be in the form of raw data such as, for example, times at which an employee clocks-in or clocks-out, days of the week that an employee logs at least some hours of work, employee safety data entered by employee, or other data associated with the employment. Employee work data 255 may also include at least partially analyzed and/or processed data such as a comparison of an employee's hours to other similarly situated employee's, whether an employees hours meet a certain criteria, etc.

Remote device 215 may include a user interface, storage capability, and other features and functionalities that permit remote device 215 to not only receive notifications and data, but to also send instructions, data, notifications, and the like. Remote device 215 may receive employee work data, analyze the data, store the analyzed data (e.g., in database 220), and send notifications to employee handheld device 210, time entry module 110, or other components of automation and security system 105-*a*, or to another location or remote device.

Network 205 provides communication via, for example, wired or wireless connections. Further, network 205 may include a plurality of communication mediums. For example, network 205 may include different communication mediums to provide communication between time entry module 110 and/or other components of automation and security system 105-*a* and other devices such as employee handheld device 210, remote device 215, and database 220. Examples of network 205 include cloud networks, local area networks (LAN), wide area networks (WAN), virtual private networks (VPN), wireless networks (using 802.11, for example) and/or cellular networks (using 3G and/or LTE, for example), etc. In some embodiments, network 205 may include the internet.

Figure 3:
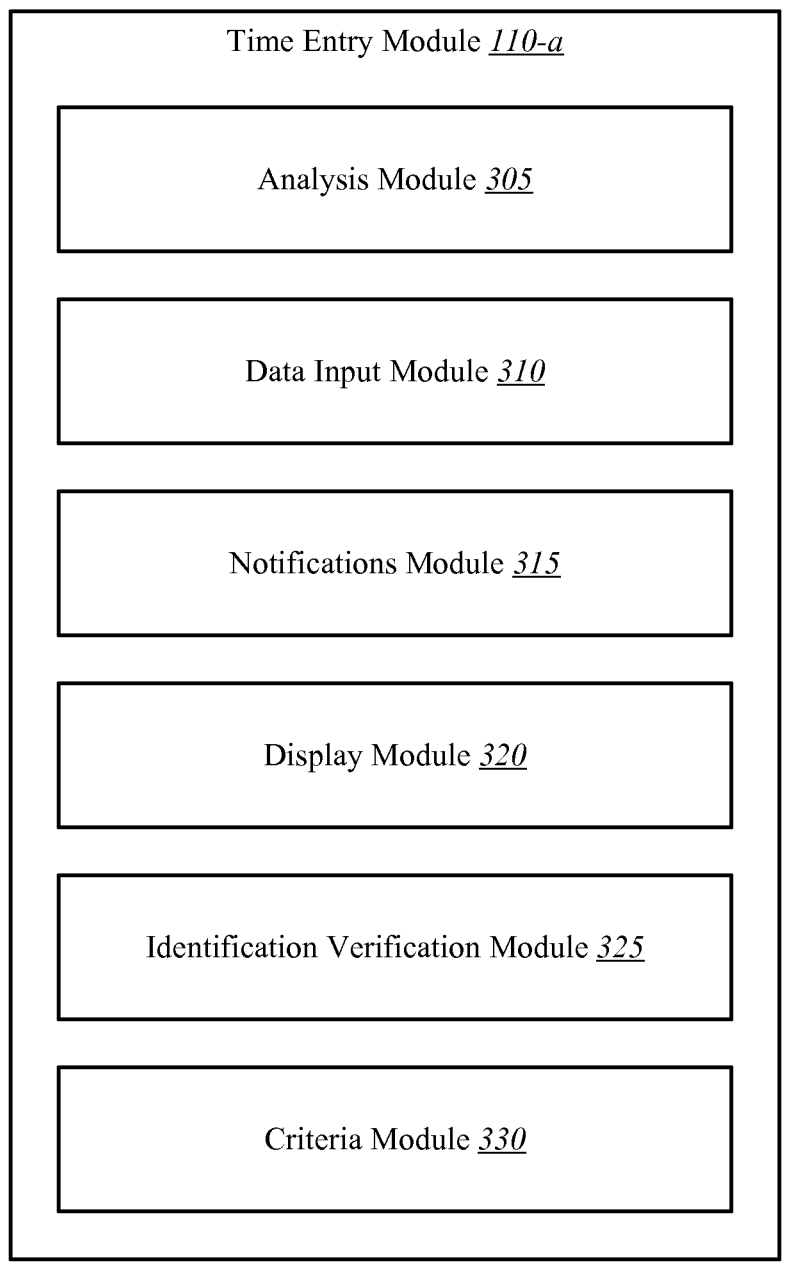
FIG. 3 is a block diagram of an example time entry module of the environments shown in FIGS. 1 and 2.

FIG. 3 is a block diagram 300 illustrating one example of time entry module 110-*a*. Time entry module 110-*a* may be one example of time entry module 110 depicted in FIGS. 1 and/or 2. As depicted, time entry module 110-*a* may include analysis module 305, data input module 310, notification module 315, display module 320, identification verification module 325, and criteria module 330. Other embodiments may include more or fewer of the modules shown in FIG. 3.

Analysis module 305 may analyze employee work data received via, for example, user interface 115 shown in FIGS. 1 and/or 2. Analyze module 305 may analyze the employee work data relative to criteria that is made available via, for example, criteria module 330. Analyze module 305 may determine, for example, whether an employee is late for a scheduled work shift based on the clock-in time of the employee. Analysis module 305 may determine, for example, whether an employee has worked a minimum number of hours (e.g., 30 hours) within a predetermined time period (e.g., one week) to determine if the employee meets criteria for a full- or part-time position.

In another example, analysis module 305 determines the gross or net cost of an employee for each shift and/or hour that the employee works. Determination of the employee cost may include compilation of the employee's benefit costs, insurance costs, taxes, hourly wages, etc. The employee's cost may be relevant to the business owner or manager's shift budget. In some business scenarios (e.g., stores and restaurants), each shift has a ceiling for overall shift costs. By balancing the number of employees and the mix of low-cost and high-cost employees, the shift manager is able to maintain a shift budget based on a scheduled list of employees and the number of hours the employees are intended to work. Analysis module 305 may determine in advance whether a shift budget will be met for a given period of time (e.g., a day shift). Time entry module 110-a may send notifications in advance of the shift via, for example, notification module 315 to a manager or business owner via remote device 215 as a warning that the shift budget is expected to be exceeded. In response, the manager or business owner may send a notification to one or more employees (e.g., via employee handheld device 210 shown in FIG. 2) to inform the employee that he should or should not attend a given shift or should limit hours of work during the shift. In another scenario, analysis module 305 may determine at completion of a shift the net cost of the shift and determine whether the shift budget has been met. A notification generated and sent via, for example, notification module 315 may be delivered to the business owner or manager. The business owner or manager may then determine whether to alter the mix of employees for future shifts.

The criteria by which analysis module 305 operates may be pre-set and/or modified by a business owner or manager, or, in some instances, an employee. Criteria module 330 may collect and store the criteria. Data input module 310 may receive information via, for example, user interface 115, shown in FIGS. 1 and/or 2 or via other sources such as, for example, employee handheld device 210 and remote device 215 shown in FIG. 2. Other data related to an employee or generally to management of a business that is associated with employee work data may be received via data input module 310.

In one example, the criteria provided by criteria module 330 and by which analysis module 305 operates may include generating a notice if an employee starts a scheduled shift late at least three times within a given time period (e.g., one month). In another example, the criteria is to produce a notice on a display via display module 320 which the employee has access to (e.g., user interface 115 shown in FIGS. 1 and/or 2) every Friday for a given month or every fifth day of employment. Alternatively, or additionally, the notice may be given as an audible message to the employee. The audible message may be sent via, for example, the employee handheld device 210 shown in FIG. 2.

Display module 320 may be used to display a variety of different notices, information, data entry blocks, etc. for the employee, employer, or other personnel associated with a place of business. In one example, display module 320 cooperates with user interface 115 (see FIG. 2) to prompt an employee to clock-in or clock-out. The clock-in or clock-out may include entry to a user login and may be referenced as a login or logout event. In another example, display module 320 may display a notice to the employee or other personnel and require confirmation that the person has read the notice or act upon the notice prior to allowing further activity on the display or user interface (e.g., clocking-in or clocking-out). Display module 320 may display other information such as requests or prompts for further information from the employee or other personnel. In one example, the requested information relates to safety criteria for the place of business (e.g., did you have any accidents today, was somebody injured, did you exceed a speed limit, did you wear a seatbelt, did you work alone, etc.). In response, analysis module 305 may determine based on criteria held by criteria module 330 whether the employee has maintained safe work practices.

Identification verification module 325 may be used to provide a primary or backup source of identification for the employee. In one example, identification verification module 325 includes a camera or other image-collecting device that collects an image of a feature of the employee (e.g., face, fingerprint, badge, etc.) and compares that image to a stored image for the employee. If the employee's identification is not properly verified, the employee may not have other options made available via time entry module 110-a including, for example, clocking-in or clocking-out. Furthermore, notifications may be sent via notification module 315 to a business owner, manager, or other person (e.g., police or security personnel) related to the failure to verify identification of the employee. Other identification verification methods may be used including, for example, voice recognition, retinal scans, security card verification, or some combination thereof by identification verification module 325 as a primary or backup source of identifying the employee in addition to or in place of entering a login pin or other means of identifying the employee.

Figure 4:
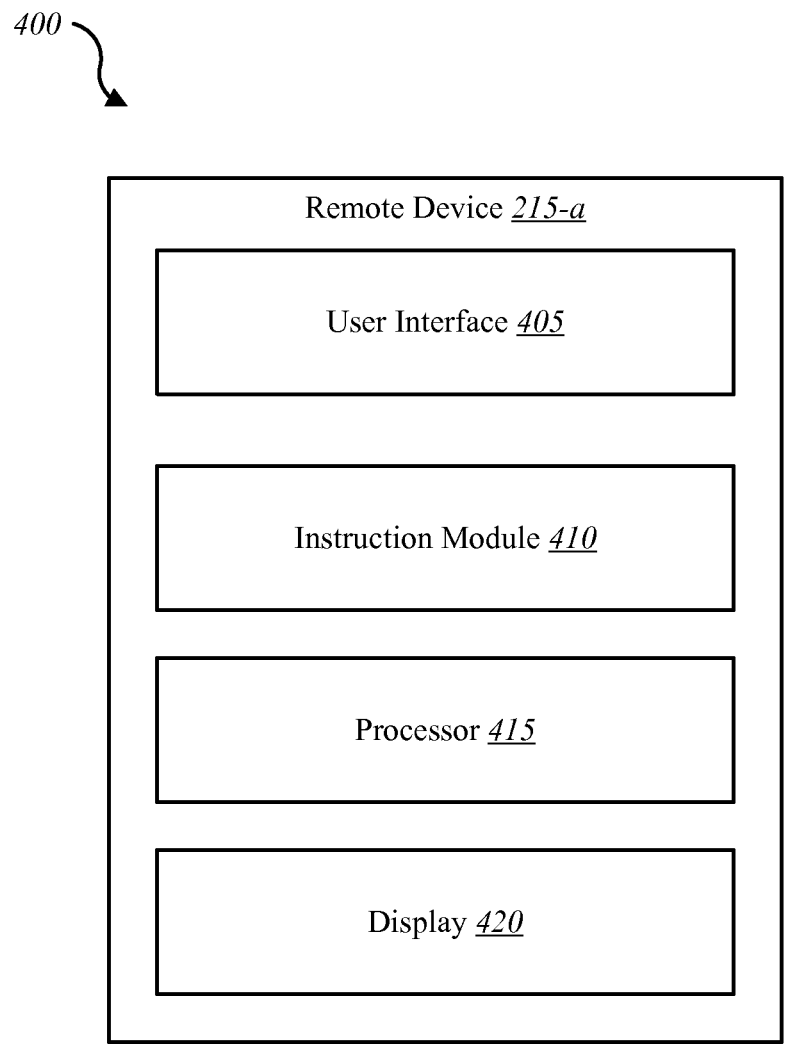
FIG. 4 is a block diagram of an example remote device of the environment shown in FIG. 2.

FIG. 4 is a block diagram 400 illustrating an example remote device 215-a. Remote device 215-a may be one example of remote device 215 depicted in FIG. 2. As depicted, remote device 215-a may include a user interface 405, instruction module 410, processor 415, and display 420. Remote device 215-a may receive employee work data (whether as raw data or as at least partially analyzed or processed data via time entry module 110-a described above with reference to FIG. 3). The employee work data may be viewed by a user at a location remote from the time entry module 110 and/or automation and security system 105-a, as shown in FIG. 2. User interface 405 may permit a user (e.g., a business owner, manager, or other personnel of the place of business) to view and/or evaluate the employee work data. In response, the user may generate instructions via instruction module 410. Instruction module 410 may transmit instructions to another device such as, for example, time entry module 110, employee handheld device 210, or database 220, as shown in FIG. 2.

In some embodiments, processor 415 may process and/or analyze the employee work data and remote device 215-a may automatically send instructions or perform other functions in response to the resulting processed data. The processed data (e.g., employee work data) may be displayed on display 420 and made visible to the user of remote device 215-a. Alternatively, the processed data may result in other notifications such as, for example, audible notifications provided to the user of remote device 215-a. Remote device 215-a may include additional or fewer components than other embodiments.

Figure 5:
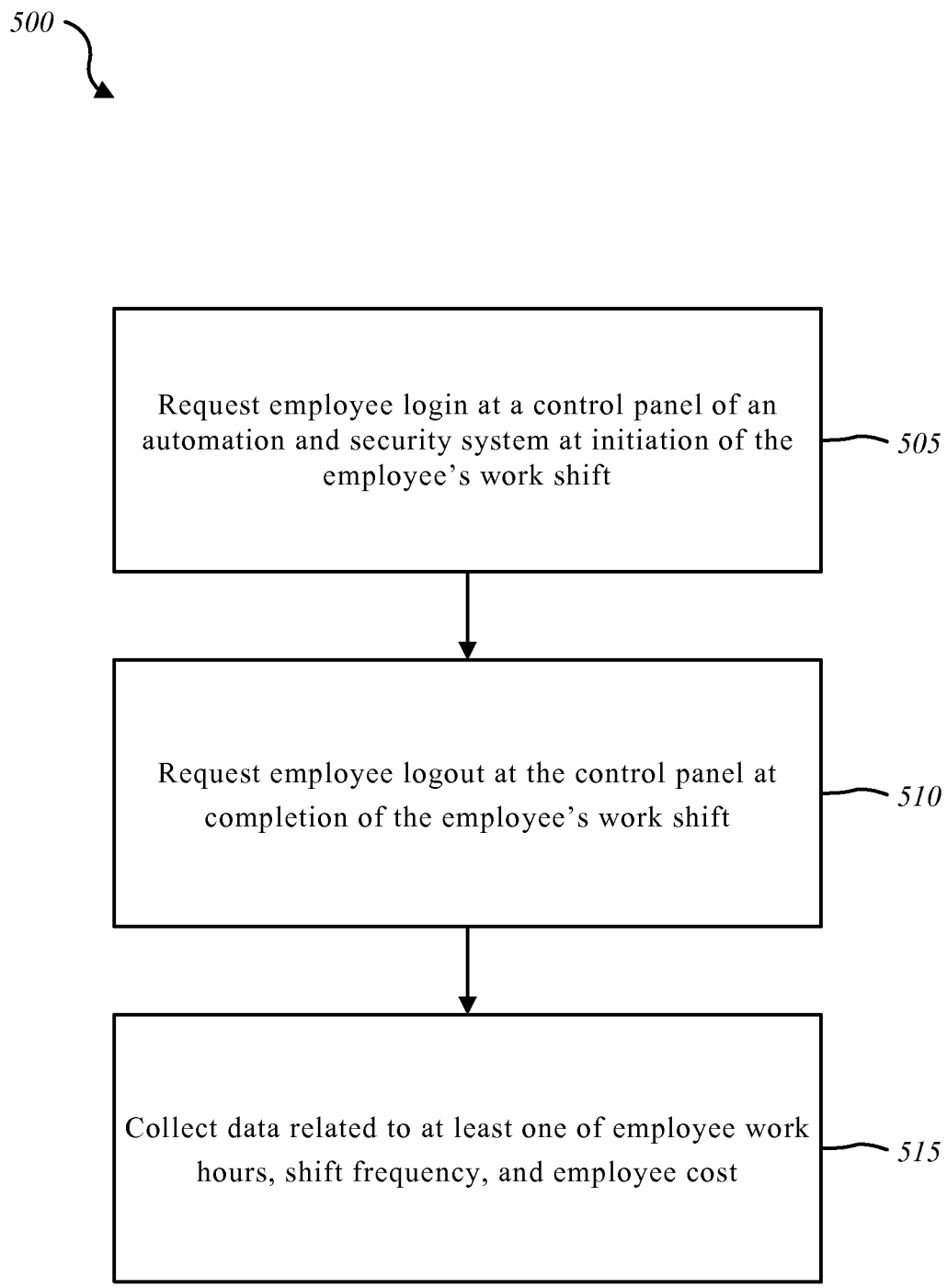
FIG. 5 is a flow diagram illustrating a method for employee time entry using an automation and security system.

FIG. 5 is a flow diagram illustrating one embodiment of a method 500 for employee time entry. In some configurations, the method 500 may be implemented by the time entry module 110 of the automation and security system 105 shown in FIGS. 1 and 2. In other examples, method 500 may be performed generally by automation and security system 105 shown in FIGS. 1 and/or 2, or even more generally by the environments 100, 200 shown in FIGS. 1 and/or 2.

At block 505, the method 500 includes requesting employee login at a control panel of an automation and security system at initiation of the employee's work shift. Block 510 includes requesting employee logout at the control panel at completion of the employee's work shift. Block 515 includes collecting data related to at least one of employee work hours, shift frequency, and employee cost.

Other steps of method 500 may include transmitting the data to a device remote from the control panel, generating a notice when the data meets a predetermined criteria, requesting employee safety information at the control panel when the employee logs out, determining from the data whether the employee has logged in on time for the work shift and generate a notice if the employee is late for the work shift, determining from the data whether the employee has worked a predetermined number of hours within a given time period, capturing and storing an image of the employee, and comparing the image to a previously stored image of the employee to confirm identity of the employee.

Figure 6:
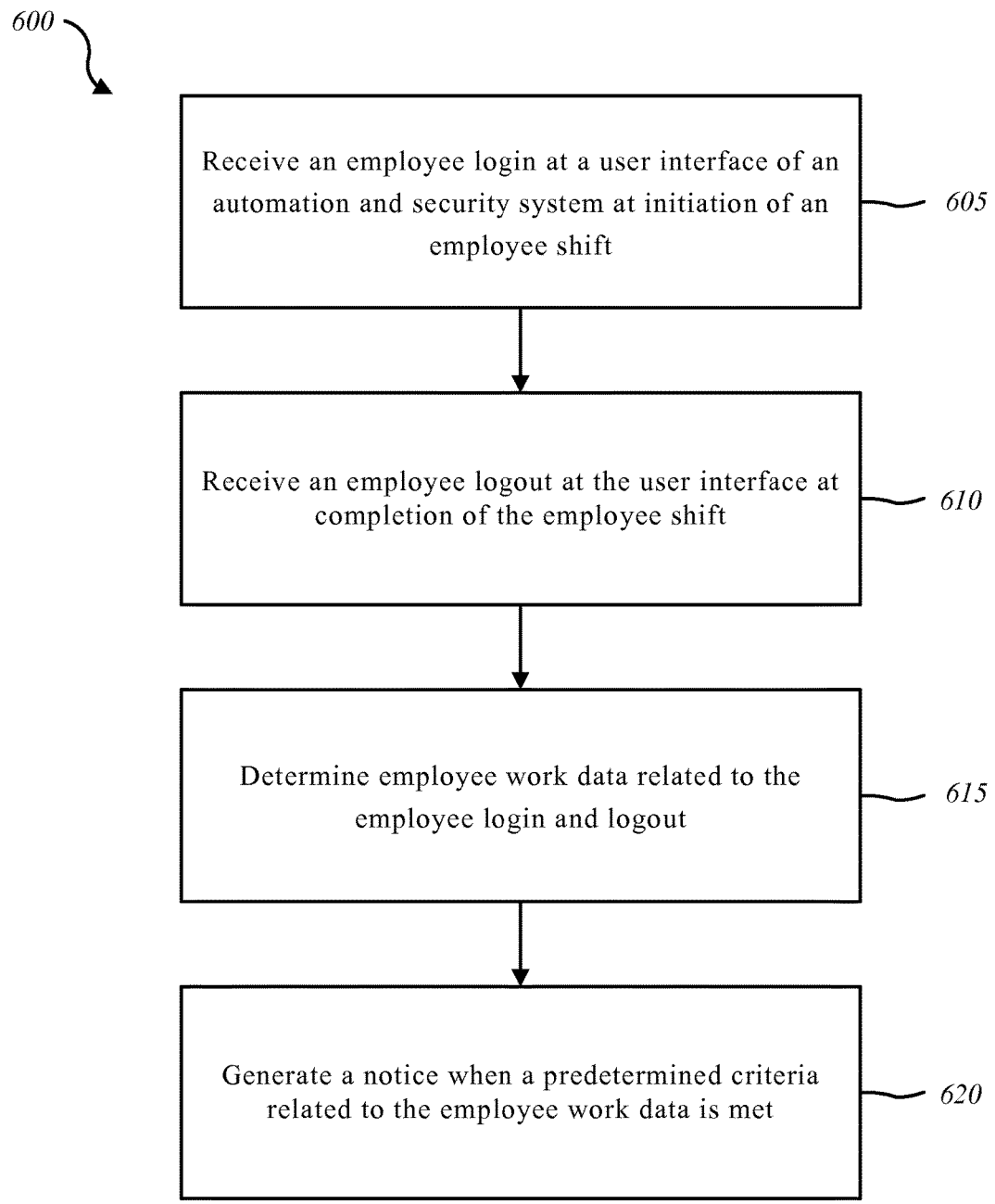
FIG. 6 is a flow diagram illustrating another method for employee time entry using an automation and security system.

FIG. 6 is a flow diagram illustrating one embodiment of a method 600 for employee time entry. In some configurations, the method 600 may be implemented by the time entry module 110 of the automation and security system 105 shown in FIGS. 1 and 2. In other examples, method 600 may be performed generally by automation and security system 105 shown in FIGS. 1 and/or 2, or even more generally by the environments 100, 200 shown in FIGS. 1 and/or 2.

At block 605, method 600 includes receiving an employee login at a user interface of an automation and security system at initiation of an employee's shift. Block 610 includes receiving an employee logout at the user interface at completion of the employee's shift. Block 615 includes determining employee work data related to the employee login and logout. Block 620 includes generating a notice when a predetermined criteria related to the employee work data is met.

Other steps of method 600 may include displaying at least one message on the control panel for the employee at at least one of login and logout, requesting confirmation from the employee that messages are received at the user interface before permitting the employee to at least one of login and logout, transmitting the notice to a remote device, providing the user interface as a control panel of the automation and security system, and displaying the notice on the control panel.

Figure 7:
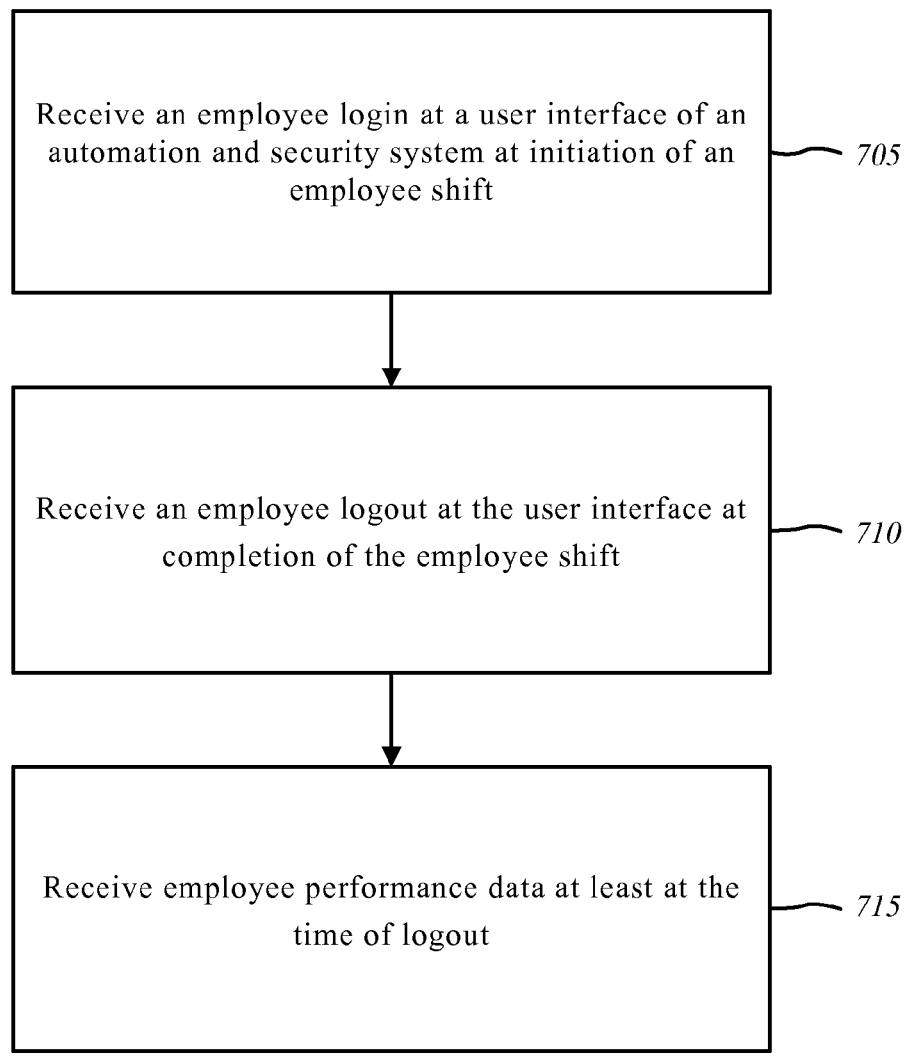
FIG. 7 is a flow diagram illustrating another method for employee time entry using an automation and security system.

FIG. 7 is a flow diagram illustrating one embodiment of a method 700 for employee time entry. In some configurations, the method 700 may be implemented by the time entry module 110 of the automation and security system 105 shown in FIGS. 1 and 2. In other examples, method 700 may be performed generally by automation and security system 105 shown in FIGS. 1 and/or 2, or even more generally by the environments 100, 200 shown in FIGS. 1 and/or 2.

At block 705, method 700 includes receiving an employee login at a user interface of an automation and security system at initiation of an employee's shift. Block 710 includes receiving an employee logout at the user interface at completion of the employee's shift. Block 715 includes receiving employee performance data at least at the time of logout. Other steps of method 700 may include providing the employee performance data as safety practices of the employee, determining employee work data based on the employee login and logout, generating a notice when predetermined criteria related to the employee work data is met, and capturing an image of the employee at at least one of login and logout.

Figure 8:
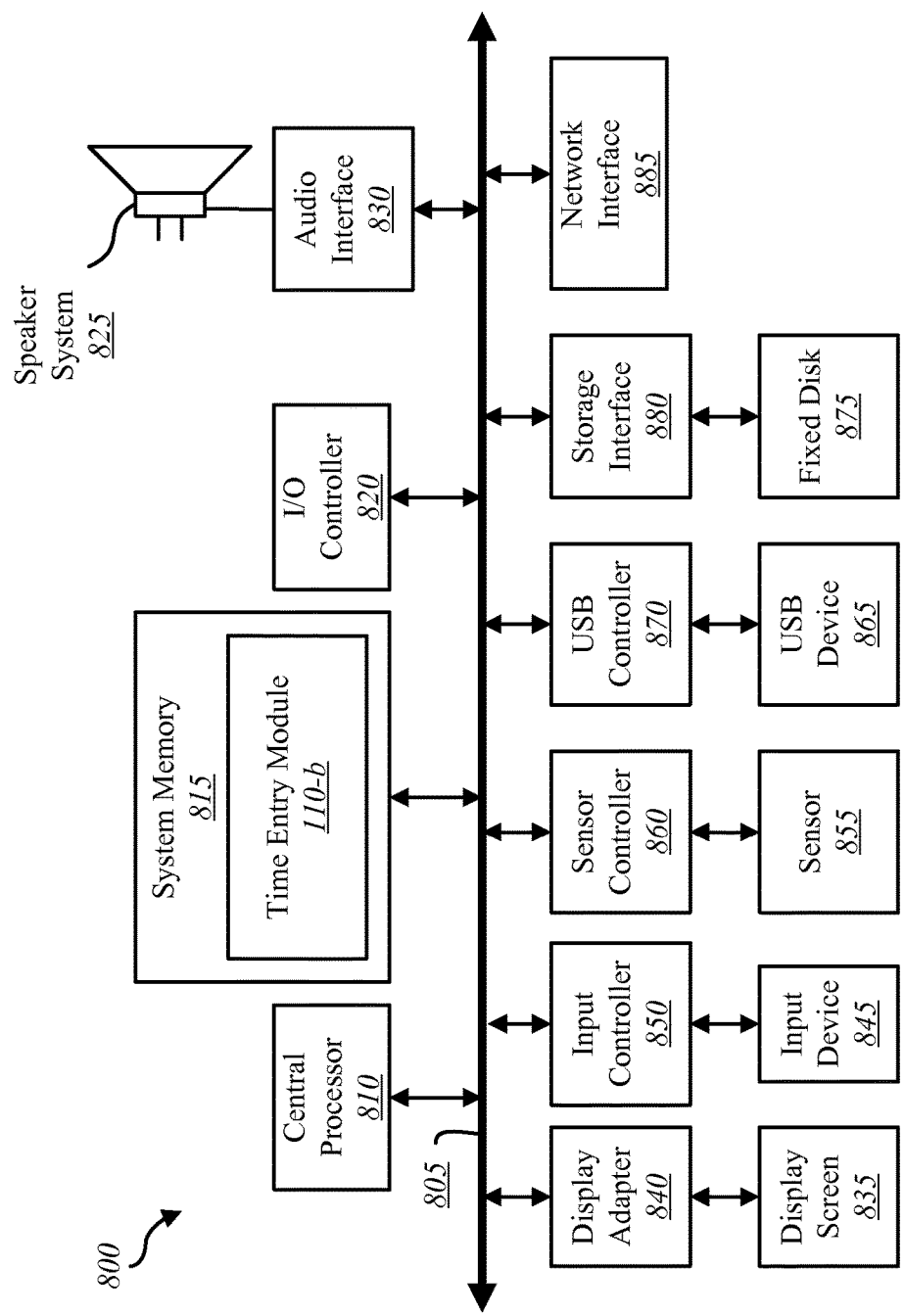
FIG. 8 is a block diagram of a computer system suitable for implementing the present systems and methods of FIGS. 1-7.

FIG. 8 depicts a block diagram of a controller 800 suitable for implementing the present systems and methods. In one configuration, controller 800 includes a bus 805 which interconnects major subsystems of controller 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the time entry module 110-b to implement the present systems and methods may be stored within the system memory 815. Applications resident with controller 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of controller 800, can connect to a standard computer readable medium for storage and/or retrieval of information, such as a fixed disk drive 875. Fixed disk drive 875 may be a part of controller 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 800 wirelessly via network interface 885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on controller 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for employee time entry, comprising:
   a wall-mounted control panel of an automation and security system dedicated to executing functions of the automation and security system, the wall-mounted control panel being configured to control an alarm system of a building, activate a sensor of the building, control lighting of the building, and control a thermostat of the building, the wall-mounted control panel including a processor, a memory in electronic communication with the processor, and instructions stored in the memory, the instructions being executable by the processor to:
   receive, via the processor, employee login information at the wall-mounted control panel of the automation and security system at initiation of an employee's work shift;
   receive, via the processor, employee logout information at the wall-mounted control panel at completion of the employee's work shift;
   generate data, via the processor, the data comprising at least one of employee work hours, shift frequency, and employee cost, based at least in part on the requested employee login and employee logout;
   identify a departure of the employee based at least in part on the employee logout information received by the wall-mounted control panel; and
   automatically adjust features of the automation and security system based at least in part on the departure of the employee, wherein the processor of the wall-mounted control panel adjusts features of the automation and security system by executing instructions to:
   turn off lights of the building;
   reduce a setting of the thermostat; or
   activating a security feature of the alarm system.

2. The apparatus of claim 1, wherein the instructions are executable by the processor to:
   transmit the data to a device remote from the control panel.

3. The apparatus of claim 1, wherein the instructions are executable by the processor to:
   generate a notice when the data meets a predetermined criteria.

4. The apparatus of claim 1, wherein the instructions are executable by the processor to:
   request employee safety information at the control panel when the employee logs out.

5. The apparatus of claim 1, wherein the instructions are executable by the processor to:
   determine from the data whether the employee has logged in on time for the employee's work shift and generate a notice if the employee is late for the employee's work shift.

6. The apparatus of claim 1, wherein the instructions are executable by the processor to:

determine from the data whether the employee has worked a predetermined number of hours within a given time period.

7. The apparatus of claim 1, wherein the instructions are executable by the processor to:
capture and store an image of the employee.

8. The apparatus of claim 7, wherein the instructions are executable by the processor to:
compare the image to a previously stored image of the employee to confirm identity of the employee.

9. The apparatus of claim 1, wherein the instructions are executable by the processor to:
confirm identity of the employee with one of an employee image, an employee voice, and an employee fingerprint.

* * * * *